United States Patent
Iwase et al.

(10) Patent No.: US 7,369,356 B2
(45) Date of Patent: May 6, 2008

(54) DISK DRIVE BREATHING FILTER INCLUDING AN INNER TUBE WITHIN A COLLECTING MATERIAL STORING PORTION OF A PERMEABLE ENVELOPE

(75) Inventors: Takayuki Iwase, Tachikawa (JP); Toshikuni Sato, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 431 days.

(21) Appl. No.: 11/217,484

(22) Filed: Sep. 2, 2005

(65) Prior Publication Data
US 2006/0092557 A1 May 4, 2006

(30) Foreign Application Priority Data
Oct. 29, 2004 (JP) .............................. 2004-316473

(51) Int. Cl.
*G11B 33/14* (2006.01)
(52) U.S. Cl. .................................................. 360/97.02
(58) Field of Classification Search ............. 360/97.02, 360/97.03
See application file for complete search history.

(56) References Cited

U.S. PATENT DOCUMENTS

| | | | |
|---|---|---|---|
| 4,329,722 A | 5/1982 | West | |
| 5,307,222 A | 4/1994 | Dion | |
| 6,266,208 B1* | 7/2001 | Voights | 360/97.02 |
| 6,395,073 B1* | 5/2002 | Dauber | 96/134 |
| 6,683,746 B1* | 1/2004 | Kuroki et al. | 360/97.02 |
| 6,940,687 B2* | 9/2005 | Hong et al. | 360/97.02 |
| 7,125,433 B2* | 10/2006 | Garikipati et al. | 55/385.6 |
| 7,130,149 B2* | 10/2006 | Hong et al. | 360/97.02 |
| 7,130,150 B2* | 10/2006 | Ng et al. | 360/97.02 |
| 7,209,319 B1* | 4/2007 | Watkins et al. | 360/97.02 |
| 7,291,208 B2* | 11/2007 | Dauber et al. | 96/134 |
| 7,306,659 B2* | 12/2007 | Gorton et al. | 96/134 |
| 2002/0075590 A1* | 6/2002 | Garikipati et al. | 360/97.02 |
| 2004/0231518 A1 | 11/2004 | Johnson et al. | |
| 2005/0168868 A1* | 8/2005 | Shin et al. | 360/97.02 |

FOREIGN PATENT DOCUMENTS

| | | |
|---|---|---|
| JP | 63-31280 Y2 | 8/1988 |
| JP | 07-254267 A | 10/1995 |

(Continued)

OTHER PUBLICATIONS

Australian Search Report dated Jul. 11, 2006 for Singapore Appln. No. SG 200505299-8.

*Primary Examiner*—Jefferson Evans
(74) *Attorney, Agent, or Firm*—Pillsbury Winthrop Shaw Pittman, LLP (57) ABSTRACT

In a case having an almost sealed structure are provided a disk-shaped recording medium, a drive motor, a head which performs information processing, a head actuator which moves the head with respect to the recording medium, and a breathing filter. The breathing filter includes an envelope which has air permeability and in which a storing portion is defined, an inner tube arranged in the storing portion and defining a passage through the storing portion, and a collecting material filled in the storing portion and around the inner tube. The inner tube has one end communicating with a breathing hole of the case and the other end having an outlet.

11 Claims, 7 Drawing Sheets

FOREIGN PATENT DOCUMENTS

| | | |
|---|---|---|
| JP | 07-254276 A | 10/1995 |
| JP | 9-297987 | 11/1997 |
| JP | 2002-355514 | 12/2002 |
| JP | 2003-151258 A | 5/2003 |
| WO | WO 03/023784 A1 | 3/2003 |

* cited by examiner

DISK DRIVE BREATHING FILTER INCLUDING AN INNER TUBE WITHIN A COLLECTING MATERIAL STORING PORTION OF A PERMEABLE ENVELOPE

CROSS-REFERENCE TO RELATED APPLICATIONS

This application is based upon and claims the benefit of priority from prior Japanese Patent Application No. 2004-316473, filed Oct. 29, 2004, the entire contents of which are incorporated herein by reference.

BACKGROUND OF THE INVENTION

1. Field of the Invention

This invention relates to a disk device having a disk as a recording medium, and in particular to a disk device having a filter provided in a case.

2. Description of the Related Art

In recent years, disk devices, such as magnetic disk devices, optical disk devices, etc., have been widely used as external recording devices of computers and image recording devices.

A magnetic disk device such as a hard disk drive (hereinafter referred to as an HDD) generally comprises a magnetic disk, a spindle motor which rotates the magnetic disk, a magnetic head which reads/writes data from/to the magnetic disk, a head suspension assembly which supports and moves the magnetic head, a voice coil motor (hereinafter referred to as a VCM) which drives this head suspension assembly, and the like, and these are housed in a case having an almost sealed structure. Such a sealed structure makes it possible to stably fly the magnetic head from the magnetic disk during reading/writing, and also to prevent dust and the like from entering into the case.

However, when the case has the almost sealed structure, an abrupt change in an ambient temperature produces a difference between air pressure inside the HDD and outside air pressure, which might cause damage to the case. To take measures against this, for example, as disclosed in Jpn. Pat. Appln. KOKAI Publication No. 7-254267, the case is provided with a small breathing hole for communication between the inside and outside of the case, and this breathing hole is fitted with a breathing filter to prevent invasion of dust, moisture and gas components from the outside air.

Generally, this kind of breathing filter is made of activated carbon. Activated carbon serves to absorb moisture and to use a neutralization reaction (ionic reaction) between an acid and an alkali to collect the gas components. For example, if an internal volume of the HDD is 15 cm$^3$ and if a temperature change of about 10° C. is caused during operation of the HDD, an outside air of about 0.5 cm$^3$ will flow into the case through the breathing hole in accordance with Charles's Law. While the flowing outside air passes through the breathing filter, the dust, moisture and gas components in the outside air are collected by the breathing filter.

A recirculation filter is also provided in the case to collect dust produced in the case due to operation of movable parts. The recirculation filter is generally provided in a direction perpendicular to the direction of airflow produced by rotation of the disk.

In recent years, magnetic disk devices have become smaller and smaller so that they can be used as the recording devices for more kinds of electronic equipment, particularly, smaller electronic equipment. For example, in the magnetic disk device whose disk is 1.8 inches or less in diameter, an installation space within the case is smaller due to a smaller size of the case. It is thus more difficult to install the breathing filter and the recirculation filter in the case. In particular, with a larger amount of activated carbon, the breathing filter is more capable of collecting the moisture and gas components. However, the breathing filter needs to be smaller due to a reduction in the installation space, which is a disadvantage in keeping the inside of the case clean. Moreover, when both the breathing filter and the recirculation filter are installed, a large installation space is required and assembly of the device becomes troublesome.

BRIEF SUMMARY OF THE INVENTION

According to an aspect of the invention, there is provided a disk device comprising: a case having an almost sealed structure and having an breathing hole; a disk-shaped recording medium arranged in the case; a drive motor which is provided in the case and which supports and rotates the recording medium; a head which performs information processing on the recording medium; a head actuator which is arranged in the case and supports the head to be movable with respect to the recording medium; and a breathing filter provided in the case. The breathing filter includes an envelope which has air permeability and in which a storing portion is defined; an inner tube which is arranged in the storing portion and has one end communicating with the breathing hole in the case and the other end having an outlet, the inner tube defining a passage through the storing portion; and a collecting material filled in the storing portion and around the inner tube.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An HDD according to a first embodiment of this invention will now be described in detail with reference to the accompanying drawings.

Figure 1:
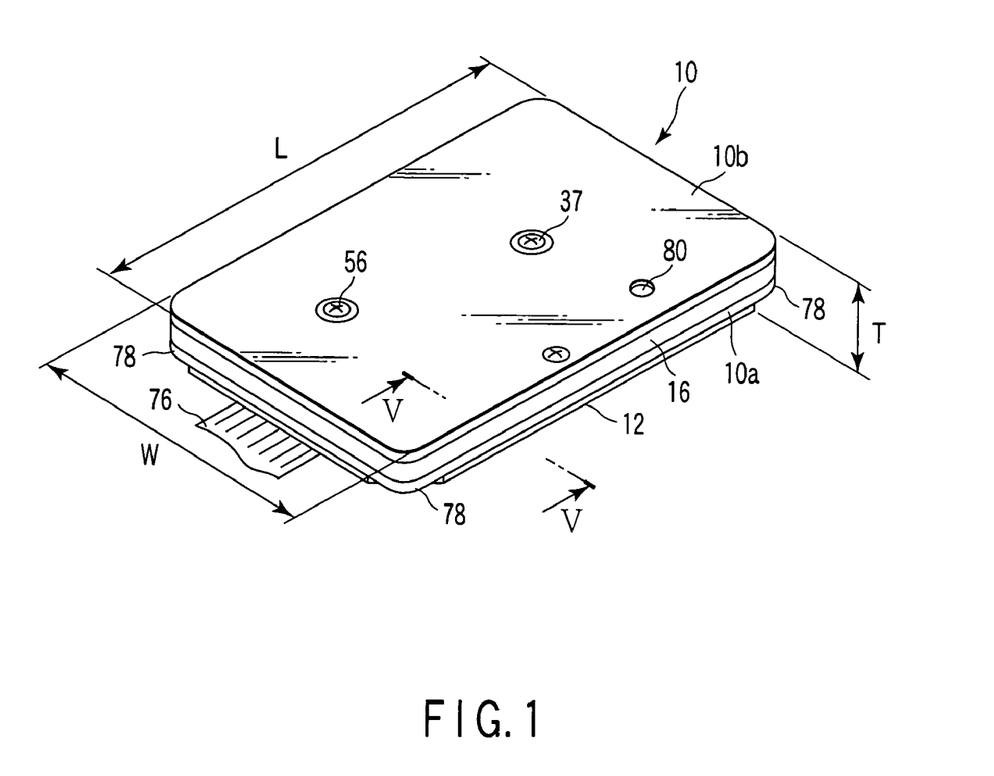
FIG. 1 is a perspective view showing an HDD according to a first embodiment of this invention.
Figure 2:
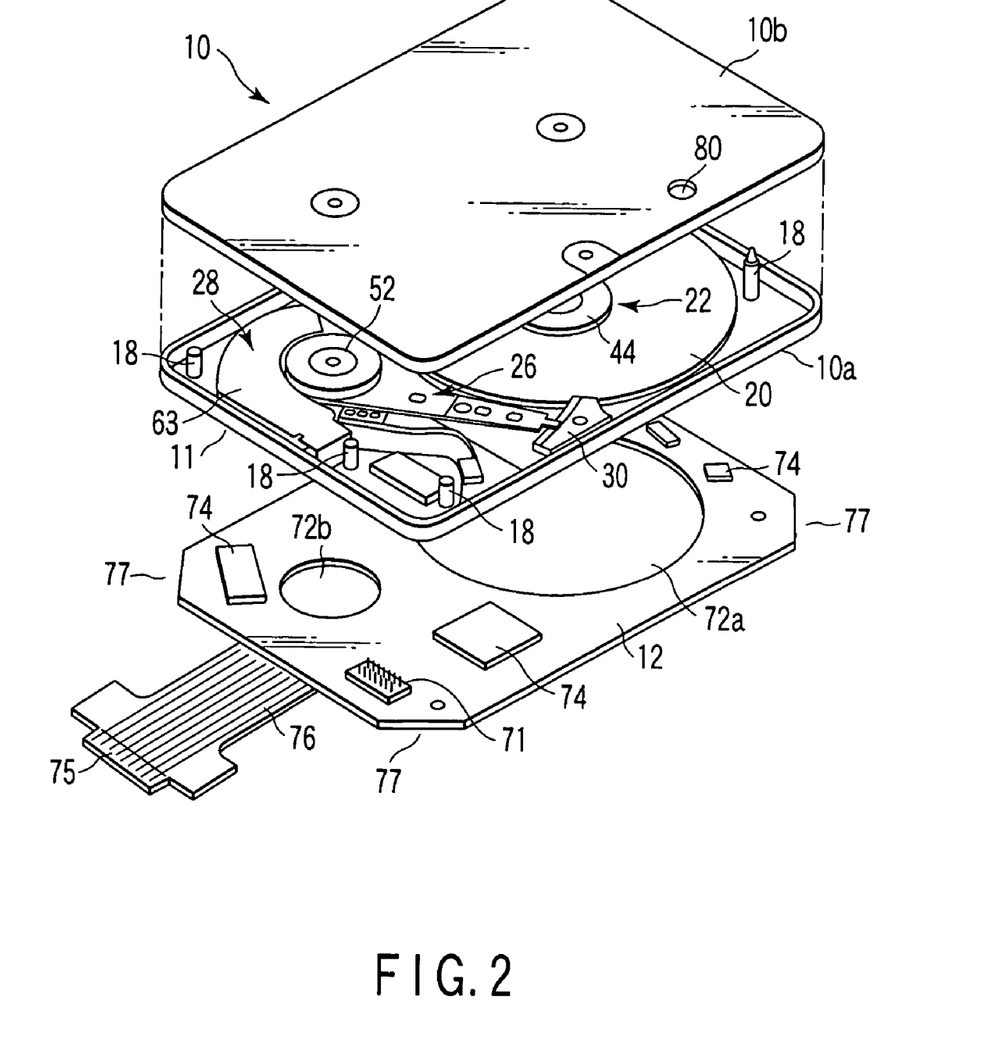
FIG. 2 is an exploded perspective view of the HDD.

As shown in FIGS. 1 and 2, the HDD comprises a case 10 in the form of a substantially rectangular box and a rectangular control circuit board 12. The case 10 contains various members, which will be described later. The circuit board 12 is overlapped on the outer surface of the case 10. The case 10 and the circuit board 12 each have a length L of 32 mm and a width W of 24 mm. A thickness T of a structure that combines the case and the control circuit board ranges from 3 to 6 mm. The thickness T is adjusted to, e.g., about 3.3 mm or 5 mm, depending on the number of disks to be held in the case.

Figure 3:
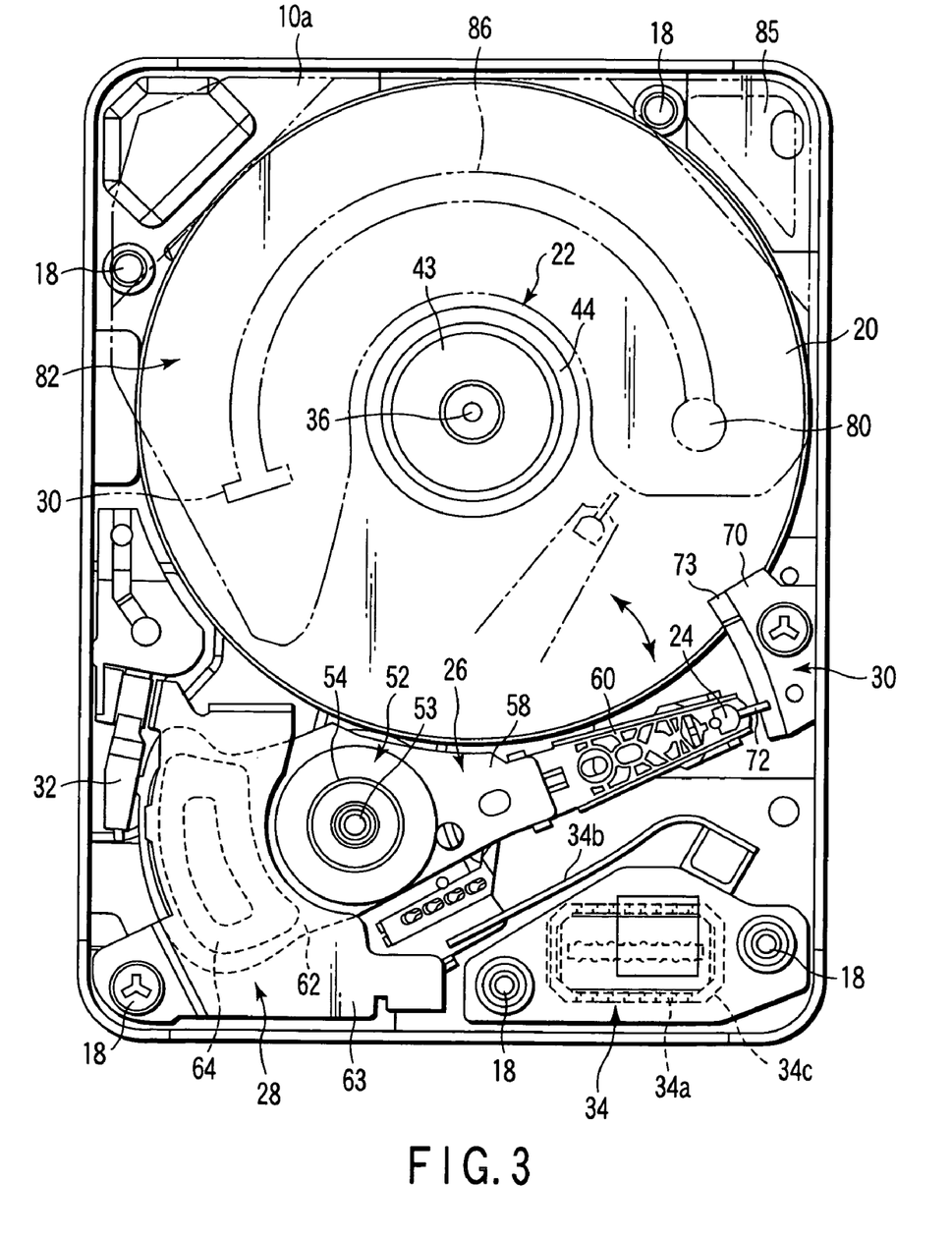
FIG. 3 is a plan view showing a case and an internal configuration of the HDD.
Figure 4:
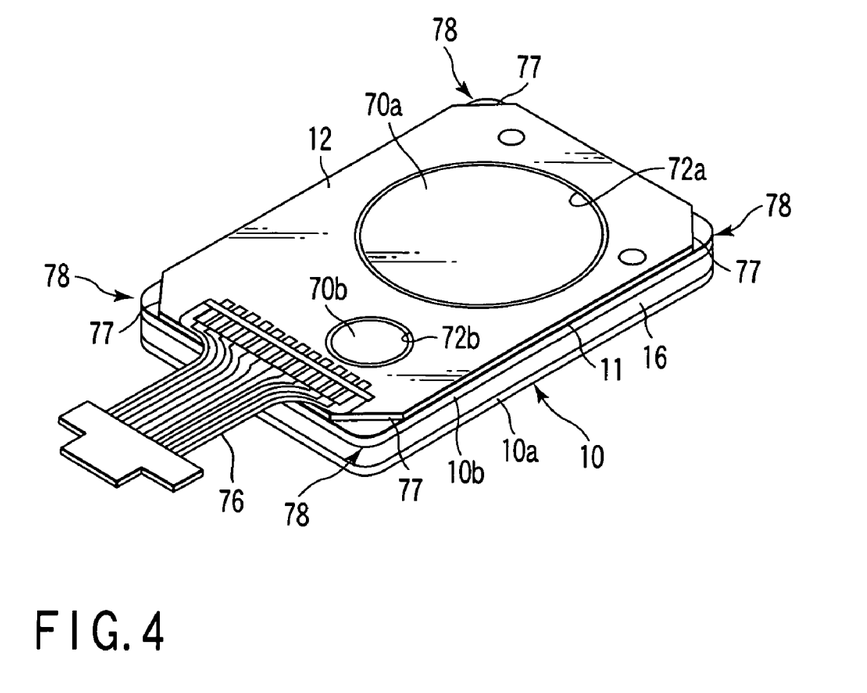
FIG. 4 is a perspective view showing a rear side of the HDD.

As shown in FIGS. 2 to 4, the case 10 comprises a first shell 10a and a second shell 10b that have substantially equal dimensions. The first and second shells 10a and 10b are substantially rectangular metallic structures, which have sidewalls set up on their respective peripheral edge portions. The shells 10a and 10b are arranged facing each other with their peripheral edge portions opposed. A belt-shaped seal member 16 is wound around the peripheral edge portions of the shells 10a and 10b. The seal member connects the peripheral edge portions of the shells and seals a gap between them. Thus, the case 10 is formed having the shape of a rectangular box.

The bottom surface of the first shell 10a forms a rectangular mounting surface 11. Four corners of the case 10, including the corners of the mounting surface 11, are rounded in a circular arc. Thus, the seal member 16 that is wound around the peripheral edge portion of the case 10 is prevented from being damaged by the corners of the case, and air-tightness is prevented from being lowered by lifting of the seal member.

In the case 10, a plurality of support posts 18 are provided on the peripheral edge portion of the case. Each support post 18 has a proximal end fixed to the inner surface of the first shell 10a and is set substantially upright on the inner surface of the first shell. Corresponding to each support post 18 in position, a tapped hole is formed in the mounting surface 11 and extends into the post.

The case 10 contains a magnetic disk 20 of, e.g., 0.85-inch diameter, for use as an information recording medium, a spindle motor 22, a magnetic head 24, and a carriage 26. The spindle motor 22 supports and rotates the disk. The magnetic head 24 is used to write and read information to and from the disk. The carriage 26 supports the magnetic head 24 for movement with respect to the magnetic disk 20. Further, the case 10 contains a voice coil motor (hereinafter referred to as a VCM) 28, a ramp load mechanism 30, a solenoid latch 32, a substrate unit 34, etc. The VCM 28 rotates and positions the carriage 26. The ramp load mechanism 30 unloads into and holds the magnetic head 24 in a position off the magnetic disk 20 when the head is moved to the peripheral edge portion of the disk. The solenoid latch 32 holds the carriage 26 in a shunt position. The substrate unit 34 has a head IC and the like.

Figure 5:
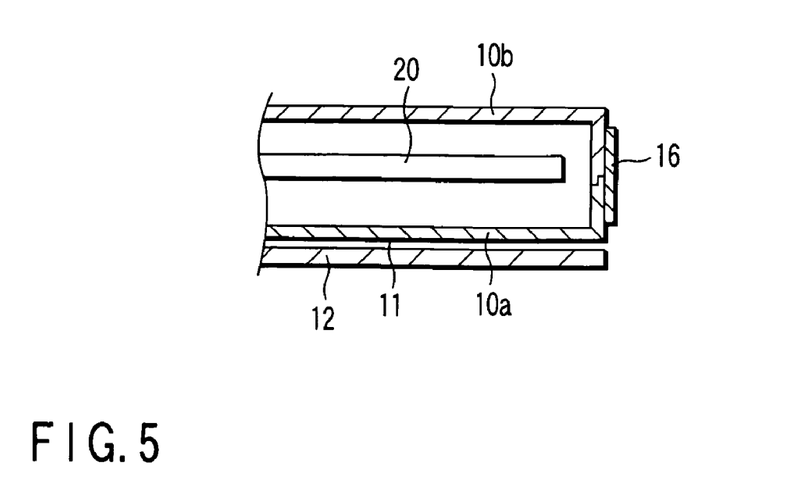
FIG. 5 is a sectional view of the HDD along the line V-V in FIG. 1.

The spindle motor 22 is mounted on the first shell 10a. The motor 22 has a pivot 36, which is fixed to the inner surface of the first shell 10a and set substantially upright on it. An extended end of the pivot 36 is screwed to the second shell 10b by a fixing screw 37 that is externally screwed into the second shell. Thus, the pivot 36 is dually supported by the first and second shells 10a and 10b.

A rotor is rotatably supported on the pivot 36 by a bearing (not shown). That end portion of the rotor on the side of the second shell 10b constitutes a columnar hub 43, and the magnetic disk 20 is fitted coaxially on the hub. An annular clamp ring 44 is fitted on an end portion of the hub 43 and holds a circumstantial edge portion of the disk 20. Thus, the disk 20 is fixed to the rotor and supported for rotation integral with the rotor.

An annular permanent magnet (not shown) is fixed to an end portion of the rotor on the side of the first shell 10a so as to be coaxial with the rotor. The spindle motor 22 has a stator core attached to the first shell 10a and a plurality of coils wound on the stator core. The stator core and the coils are located outside and spaced from the magnet.

The carriage 26 that constitutes the head actuator is provided with a bearing assembly 52 that is fixed on the inner surface of the first shell 10a. The bearing assembly 52 has a pivot 53 and a cylindrical hub 54. The pivot 53 is set upright on the inner surface of the first shell 10a. The hub 54 is rotatably supported on the pivot 53 by a pair of bearings. An extended end of the pivot 53 is screwed to the second shell 10b by a fixing screw 56 that is externally screwed into the second shell. Thus, the pivot 53 is dually supported by the first and second shells 10a and 10b. The bearing assembly 52 that serves as a bearing portion is located side by side with the spindle motor 22 in the longitudinal direction of the case 10.

The carriage 26 comprises an arm 58 extending from the hub 54, a suspension 60 in the form of an elongate plate extending from the distal end of the arm, and a support frame 62 extending from the hub 54 in a direction opposite from the arm. The magnetic head 24 is supported on an extended end of the suspension 60 by a gimbals portion (not shown). The head 24 is subjected to a given head load toward the surface of the magnetic disk 20 by a spring force of the suspension 60. A voice coil 64 that constitutes the VCM 28 is fixed integrally to the support frame 62.

The VCM 28, which serves to rotate the carriage 26 around the bearing assembly 52, comprises a pair of yokes 63 and a magnet (not shown). The yokes 63 are fixed on the first shell 10a and opposed to each other with a gap between them. The magnet is fixed to the inner surface of one of the yokes and opposed to the voice coil 64. When the coil 64 is energized, the carriage 26 rotates between the shunt position shown in FIG. 3 and an operating position above the surface of the magnetic disk 20. The magnetic head 24 is positioned on a desired track of the disk 20. The solenoid latch 32 that is fixed to the first shell 10a latches the carriage 26 that is moved to the shunt position, thereby preventing the carriage from moving from the shunt position to the operating position if the HDD is subjected to any external force, such as a shock.

The ramp load mechanism 30 comprises a ramp member 70 and a tab 72. The ramp member 70 is fixed to the inner surface of the first shell 10a and situated opposite the peripheral edge portion of the magnetic disk 20. The tab 72 extends from the distal end of the suspension 60 and serves as an engaging member. The ramp member 70 is formed by bending a plate material and has a ramp surface 73 that can be engaged by the tab 72. When the carriage 26 rotates from the inner peripheral portion of the disk 20 to the shunt position outside the disk, the tab 72 engages the ramp surface 73 of the ramp member 70. Thereafter, the tab 72 is pulled up along a slope of the ramp surface to unload the magnetic head 24. When the carriage 26 rocks to the shunt position, the tab 72 is supported on the ramp surface 73 of the ramp member 70. Thereupon, the magnetic head 24 is kept off the surface of the magnetic disk 20.

The substrate unit 34 has a body 34a that is formed of a flexible printed circuit board. The body 34a is fixed to the inner surface of the first shell 10a. Electronic components, such as the head IC, a temperature sensor, etc., are mounted on the body 34a. The substrate unit 34 has a main flexible printed circuit board (hereinafter referred to as a main FPC) 34b that extends from the body 34a. An extended end of the main FPC 34b is connected to that part of the carriage 26 which is situated near the bearing assembly 52. Further, the extended end of the main FPC 34b is connected electrically to the magnetic head 24 by a cable (not shown) that is located on the arm 58 and the suspension 60. A connector 34c for connection with the control circuit board 12 is mounted on the bottom surface of the body of the substrate unit 34. The connector 34c is exposed to the mounting surface 11 of the first shell 10a through an opening in the first shell.

As shown in FIGS. 2 and 4, the control circuit board 12, a printed circuit board, is a rectangular structure that is substantially equal to the mounting surface 11 of the case 10 in length and width. The mounting surface 11 of the case 10 is formed having circular protrusions 70a and 70b that correspond to the spindle motor 22 and the bearing assembly 52, respectively. The control circuit board 12 is formed having circular openings 72a and 72b that correspond to the protrusions 70a and 70b, respectively. Four corner portions of the circuit board 12 are obliquely cut at, e.g., 45 degrees to each side, and individually form notch portions 77. A plurality of electronic components 74 and a connector 71 are mounted on the circuit board 12. Further, a flexible printed circuit board 76 for electrical connection between the HDD and an external device is connected to the circuit board 12. It is drawn out from one short side of the circuit board 12, and a plurality of connector terminals 75 are formed on its extended end.

The control circuit board 12, constructed in this manner, is overlapped on the mounting surface 11 of the case 10 and screwed to the first shell 10a with screws. As this is done, the circuit board 12 is located with its four sides aligned or coincident individually with four sides of the mounting surface 11. The protrusions 70a and 70b on the mounting surface 11 are located in the openings 72a and 72b, respectively, of the circuit board 12. The connector 71 on the circuit board 12 is connected to the connector on the substrate unit 34.

The notch portions 77 at the four corner portions of the control circuit board 12 are situated corresponding individually to the four corner portions of the mounting surface 11. Thus, the four corner portions of the mounting surface 11 are exposed to the outside without being covered by the circuit board 12. The corner portions of the case 10, including the four exposed corner portions of the mounting surface 11, individually constitute retaining portions 78 for holding the case without contact with the circuit board 12.

As shown in FIGS. 1 and 2, a breathing hole 80 is formed in the second shell 10b for communication between the inside and outside of the case 10. As shown in FIG. 3 and FIGS. 6 to 8, a breathing filter 82 is provided in the case 10 to remove dust, moisture, gas components, etc., from outside air flowing into the case 10 through the breathing hole 80. A recirculation filter 85 is also provided in the case 10 to collect dust produced in the case due to operation of movable parts.

Figure 6:
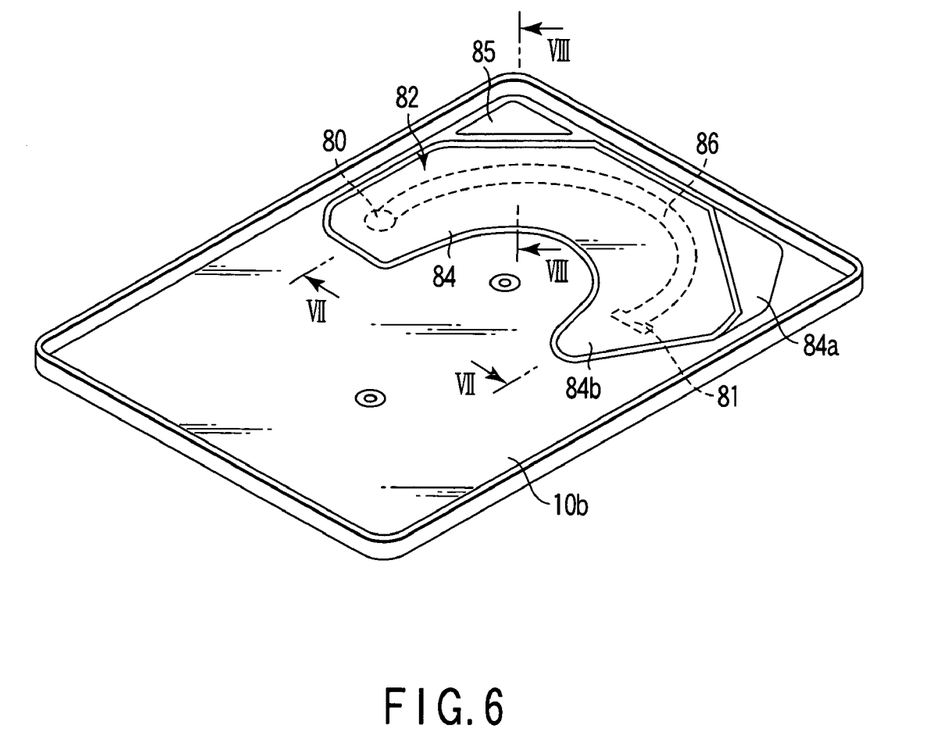
FIG. 6 is a perspective view showing an inner side of a second shell configuring the case.
Figure 7:
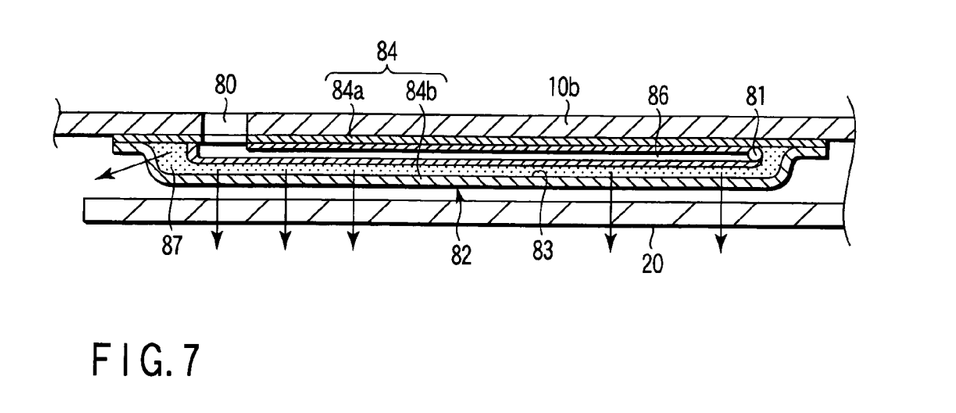
FIG. 7 is a sectional view of the HDD along the line VII-VII in FIG. 6.
Figure 8:
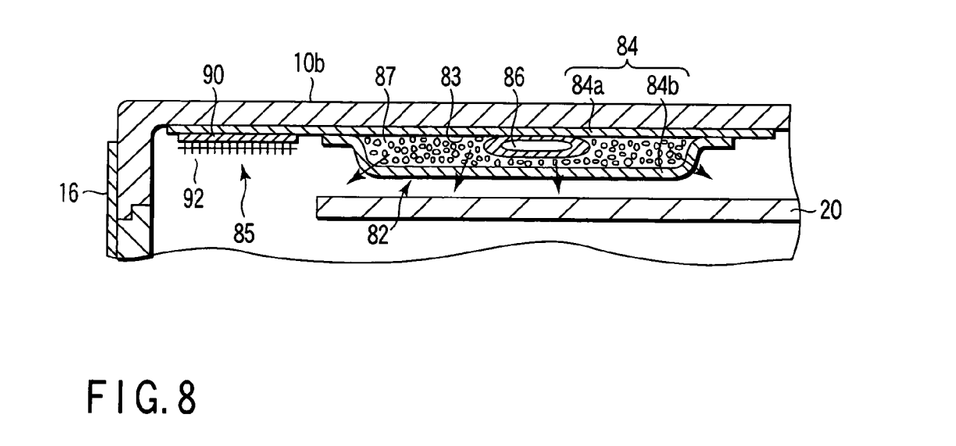
FIG. 8 is a sectional view of the HDD along the line VIII-VIII in FIG. 6.

The breathing filter 82 has an envelope 84 which has air permeability and in which a storing portion 83 is defined, an inner tube 86 arranged in the storing portion and defining a passage passing through the storing portion, and a collecting material 87 filling the storing portion around the inner tube. The envelope 84 has a flat base 84a fixed onto an inner surface of the second shell 10b, and a cover 84b fixed to the base and defining the storing portion 83. The base 84a is formed of, for example, a polyester film, and the cover 84b is formed of, for example, a material which has air permeability, such as polytetrafluoroethylene. The envelope 84 has a flat form and is substantially C-shaped as a whole.

The inner tube 86 has one end communicating with the breathing hole 80 of the second shell 10b and the other end having an outlet 81 which opens in the storing portion 83. The inner tube 86 extends in the storing portion 83 of the envelope 84 substantially in parallel with a surface of the magnetic disk 20. In addition, the inner tube 86 extends substantially in an arc-shaped state coaxially with the magnetic disk 20. It is to be noted that the inner tube 86 may be formed of a material which has air permeability.

For example, particulate activated carbon is used as the collecting material 87 filling the storing portion 83. In stead of activated carbon, alumina particles, a fibrous substance or the like can be used as the collecting material 87 depending on what to collect.

The breathing filter 82 is fixed to the second shell 10b by affixing the base 84a to the inner surface of the second shell 10b, and the breathing filter 82 closes the breathing hole 80 and faces the surface of the magnetic disk 20 in the case 10. The breathing filter 82 is arranged to face parts of the surface of the magnetic disk 20 except for a central part of the magnetic disk, here a part corresponding to the clamp ring 44 and except for an area where the carriage 26 including the magnetic head 24 moves, that is, to face the majority of the surface of the magnetic disk.

The outside air which has been drawn into the breathing filter 82 from the outside of the case 10 through the breathing hole 80 flows through the passage in the inner tube 86, and flows out from the outlet 81 into the storing portion 83. The dust and the like in the outside air stick to an inner surface of the inner tube 86 and are thus collected while passing through the passage. The outside air which has flown into the storing portion 83 will flow around the collecting material 87 which collects the moisture and gas components in the outside air. The outside air thus cleaned is discharged from the cover 84b of the envelope 84 into the case 10. The outside air which has passed out of the outlet 81 of the inner tube 86 into the storing portion 83 reaches almost everywhere in the storing portion 83, and is then discharged into the case 10 through the cover 84b.

On the other hand, the recirculation filter 85 is fixed onto the base 84a of the breathing filter 82 outside the storing portion 83, and is configured integrally with the breathing filter. The recirculation filter 85 has, for example, a flat triangular shape, and is provided at a corner of the second shell 10b. The recirculation filter 85 has a plate-shaped base member 90 affixed to the cover 84b, and a fibrous collecting member 92 provided on the base member. The collecting member 92 forms a collecting surface extending substantially in parallel with the surface of the magnetic disk 20, that is, extending substantially in parallel with airflow produced by rotation of the magnetic disk. The collecting member 92 is formed of, for example, polypropylene. The recirculation filter 85 thus configured uses the collecting member 92 to collect and retain dust contained in airflow within the case 10.

According to the HDD configured as described above, the dust, moisture, gas components, etc., in the outside air drawn into the case 10 through the breathing hole 80 can be collected by the breathing filter 82, while the dust contained in the airflow within the case 10 can be collected by the collecting member 92 of the recirculation filter 85. This makes it possible to increase the degree of cleanliness in the case 10 and to improve reliability.

The breathing filter 82 has the envelope 84 and the inner tube 86 arranged in the envelope, has a flat form, and is disposed to face the majority of the surface of the magnetic disk 20. Therefore, a dead space between the magnetic disk surface and the case inner surface can be effectively used to arrange the breathing filter 82, and the breathing filter can be increased in size. It is thus possible to secure a sufficient amount of collecting material 87 in the breathing filter 82 and improve collecting capability. As a result, it is possible to increase the degree of cleanliness in the case 10.

The recirculation filter 85 is fixed to and integrated with the breathing filter 82. This allows the breathing filter 82 and the recirculation filter 85 to be handled as one component, and it is possible to reduce an installation space in the case 10 and facilitate assembly.

As understood from the above, there can be obtained a compact HDD in which the degree of cleanliness is increased.

Figure 9:
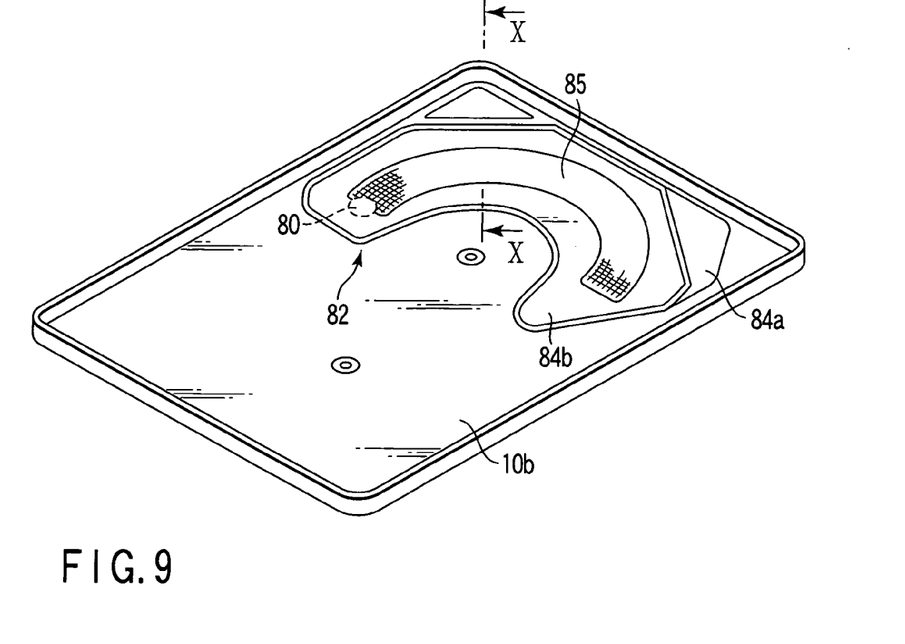
FIG. 9 is a perspective view showing the inner side of the second shell in the HDD according to a second embodiment of this invention.
Figure 10:
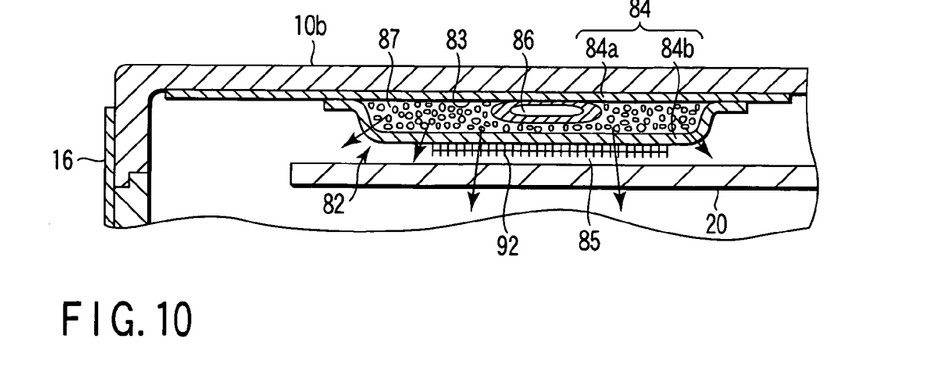
FIG. 10 is a sectional view of the HDD along the line X-X in FIG. 9.

An HDD according to a second embodiment of this invention will be described. As shown in FIGS. 9 and 10, according to the second embodiment, a recirculation filter 85 is fixed to an outer surface of the cover 84b of the breathing filter 82, and is located to overlap a storing portion 23. The recirculation filter 85 does not have any base plate and only has the fibrous collecting member 92, and the collecting member 92 is directly fixed to the cover 84b.

The collecting member 92 is formed to be arc-shaped and flat, and extends along the cover 84b. The collecting member 92 forms a collecting surface extending substantially parallel to the surface of the magnetic disk 20, that is, extending substantially parallel to the airflow produced by the rotation of the magnetic disk. The collecting member 92 is formed of, for example, polypropylene. The recirculation filter 85 thus configured uses the collecting member 92 to collect and retain dust contained in the airflow within the case 10. The recirculation filter 85 may comprise a base member.

In the second embodiment, configurations of other parts in the HDD are the same as those in the first embodiment, and the same reference numerals are assigned to the same parts in the first embodiment and those parts will not be described in detail. Functional effects similar to those in the first embodiment described above can be obtained in the second embodiment. The collecting surface of the recirculation filter 85 can be enlarged to improve the collecting capability.

This invention is not limited directly to the embodiments described above, and its components may be embodied in modified forms without departing from the scope or spirit of the invention. Further, various inventions may be made by suitably combining a plurality of components described in connection with the foregoing embodiments. For example, some of the components according to the foregoing embodiments may be omitted. Furthermore, components according to different embodiments may be combined as required.

Constitutional materials of the breathing filter and the recirculation filter are not limited to those described in the above embodiments, and can be changed as necessary. The number of magnetic disks is not limited to one, and can be increased as necessary. The number of heads is not limited to one, and can be increased as necessary. The size of the magnetic disk is not limited to 0.85 inches, but may be 1.0 inches, 1.8 inches, 2.5 inches or other size.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A disk device comprising:
    a case having an almost sealed structure and having an breathing hole;
    a disk-shaped recording medium arranged in the case;
    a drive motor which is provided in the case and which supports and rotates the recording medium;
    a head which performs information processing on the recording medium;
    a head actuator which is arranged in the case and supports the head to be movable with respect to the recording medium; and
    a breathing filter provided in the case, the breathing filter including an envelope which has air permeability and in which a storing portion is defined; an inner tube which is arranged in the storing portion and has one end communicating with the breathing hole in the case and the other end having an outlet, the inner tube defining a passage through the storing portion; and a collecting material filled in the storing portion and around the inner tube.

2. The disk device according to claim 1, which further comprises a recirculation filter which collects dust contained in the airflow, is arranged in the case and has a collecting surface extending substantially in parallel with airflow produced by rotation of the recording medium.

3. The disk device according to claim 2, wherein the envelope of the breathing filter has a base fixed onto an inner surface of the case, and a cover fixed to the base, defining the storing portion and having air permeability.

4. The disk device according to claim 3, wherein the recirculation filter is fixed onto the base of the breathing filter, and is formed integrally with the breathing filter.

5. The disk device according to claim 3, wherein the recirculation filter is fixed to the cover of the breathing filter, and is formed integrally with the breathing filter.

6. The disk device according to claim 2, wherein the recirculation filter has a plate-shaped base member, and a fibrous collecting member provided on the base member and forming the collecting surface.

7. The disk device according to claim 2, wherein the recirculation filter has a fibrous collecting member forming the collecting surface.

8. The disk device according to claim 1, wherein the case comprises a first shell mounted with the drive motor, the recording medium and the head actuator, and a second shell facing a surface of the recording medium, and the breathing filter is fixed to an inner surface of the second shell and faces the surface of the recording medium.

9. The disk device according to claim 8, wherein the breathing filter is arranged to face the surface of the recording medium except for a central part of the recording medium and an area where the head moves.

10. The disk device according to claim 1, wherein the case is formed to have a length of about 32 mm and a width of about 24 mm.

11. The disk device according to claim 1, wherein the recording medium is formed to have a diameter of 0.85 inches.

* * * * *